United States Patent
Zhai et al.

(10) Patent No.: US 9,221,008 B2
(45) Date of Patent: Dec. 29, 2015

(54) GAS PREPURIFICATION PROCESS

(75) Inventors: Suling Zhai, Reading (GB); Yaping Lu, Fanwood, NJ (US)

(73) Assignee: Linde Aktiengesellschaft, Munich (DE)

( * ) Notice: Subject to any disclaimer, the term of this patent is extended or adjusted under 35 U.S.C. 154(b) by 402 days.

(21) Appl. No.: 13/497,149

(22) PCT Filed: Dec. 2, 2010

(86) PCT No.: PCT/US2010/058656
§ 371 (c)(1),
(2), (4) Date: May 23, 2012

(87) PCT Pub. No.: WO2011/071735
PCT Pub. Date: Jun. 16, 2011

(65) Prior Publication Data
US 2012/0297978 A1   Nov. 29, 2012

(30) Foreign Application Priority Data
Dec. 10, 2009 (CN) .......... 2009 1 0258550

(51) Int. Cl.
*B01D 53/14* (2006.01)
*B01D 53/02* (2006.01)
*B01D 53/04* (2006.01)
*B01D 53/047* (2006.01)

(52) U.S. Cl.
CPC .......... *B01D 53/1493* (2013.01); *B01D 53/025* (2013.01); *B01D 53/047* (2013.01); *B01D 53/0462* (2013.01); *B01D 53/1425* (2013.01); *B01D 2252/204* (2013.01); *B01D 2252/20457* (2013.01); *B01D 2252/20473* (2013.01); *B01D 2252/30* (2013.01); *B01D 2257/108* (2013.01); *B01D 2257/302* (2013.01); *B01D 2257/304* (2013.01); *B01D 2257/504* (2013.01); *B01D 2257/7022* (2013.01)

(58) Field of Classification Search
CPC .................. B01D 53/1493; B01D 2252/204; B01D 2252/20457; B01D 2252/20473; B01D 2252/30; B01D 2257/108; B01D 2257/302; B01D 2257/304; B01D 2257/504; B01D 2257/7022; B01D 53/025; B01D 53/0462; B01D 53/047; B01D 53/142
See application file for complete search history.

(56) References Cited

U.S. PATENT DOCUMENTS

| | | | | |
|---|---|---|---|---|
| 5,461,872 A * | 10/1995 | Mostello | | 62/651 |
| 5,560,763 A * | 10/1996 | Kumar | | 95/98 |
| 5,571,309 A * | 11/1996 | Kumar | | 95/99 |
| 5,626,033 A * | 5/1997 | Tamhankar et al. | | 62/617 |
| 6,113,869 A * | 9/2000 | Jain et al. | | 423/219 |
| 6,391,092 B1 * | 5/2002 | Shen et al. | | 95/120 |
| 6,432,171 B1 * | 8/2002 | Kumar et al. | | 95/120 |
| 6,579,343 B2 * | 6/2003 | Brennecke et al. | | 95/51 |
| 6,805,727 B2 * | 10/2004 | Alper | | 95/90 |
| 7,066,986 B2 * | 6/2006 | Haben et al. | | 95/99 |
| 7,931,736 B2 * | 4/2011 | Hidano et al. | | 95/120 |
| 2002/0189444 A1 | 12/2002 | Brennecke et al. | | |
| 2004/0129136 A1 * | 7/2004 | Haben et al. | | 95/96 |
| 2005/0230659 A1 | 10/2005 | Hampden-Smith et al. | | |
| 2006/0165574 A1 | 7/2006 | Sayari | | |
| 2007/0101762 A1 * | 5/2007 | Schaub et al. | | 62/617 |

(Continued)

*Primary Examiner* — Amber R Orlando
*Assistant Examiner* — Britanny Precht
(74) *Attorney, Agent, or Firm* — Philip H. Von Neida

(57) ABSTRACT

A method for removing impurities from a feed air gas stream prior to the stream being fed to a cryogenic distillation unit. The feed air gas stream contacts an ionic liquid which adsorbs the impurities from the air. The method can use one or more beds such as in pressure swing adsorption processes.

6 Claims, 1 Drawing Sheet

(56) References Cited

U.S. PATENT DOCUMENTS

2008/0112866 A1 5/2008 Davis
2009/0242840 A1 10/2009 Olschimke et al.
2010/0115994 A1* 5/2010 Hayashida et al. ............ 62/640

* cited by examiner

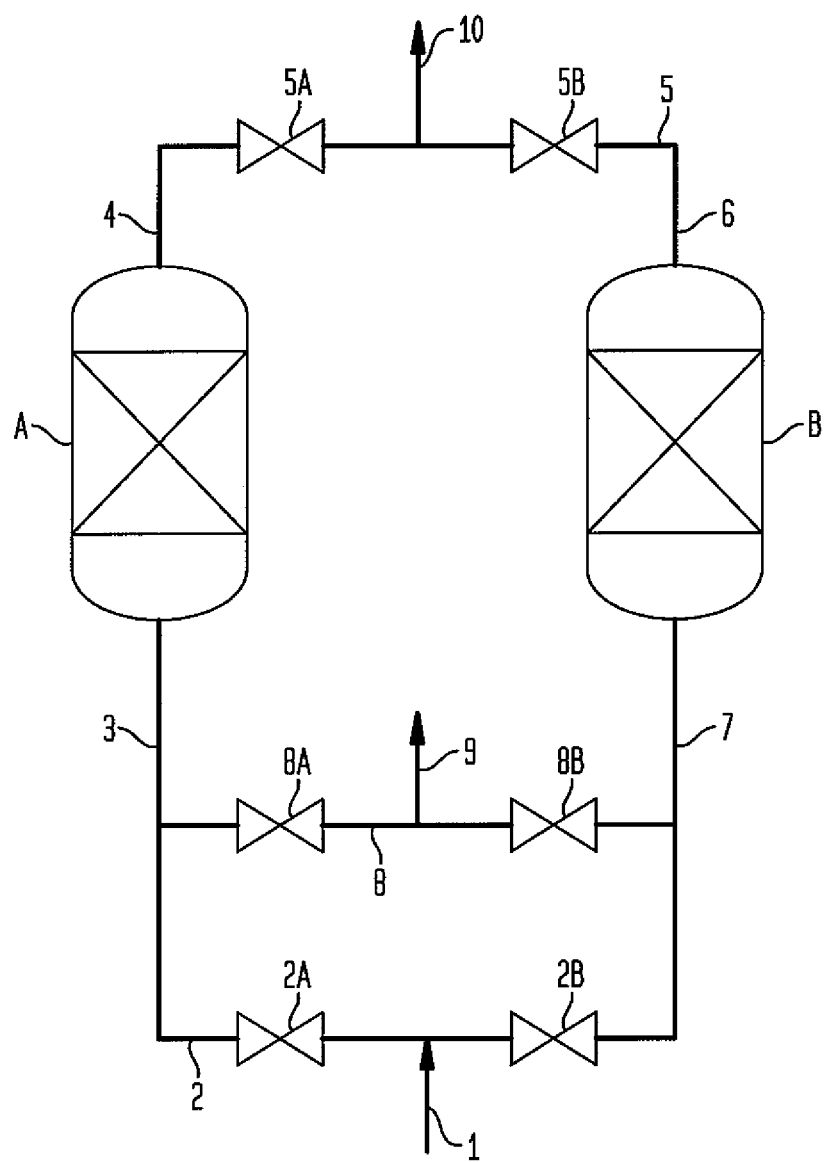

GAS PREPURIFICATION PROCESS

BACKGROUND OF THE INVENTION

Modern air separation unit (ASU) plants typically use adsorbent beds to remove impurities in feed air before cryogenic distillation takes place. These pre-purification units (PPUs) typically remove components from air that can be detrimental to proper cryogenic air separation. These impurities include water, carbon dioxide, carbon monoxide, hydrogen and hydrocarbons such as butane, propylene and acetylene. Other hydrocarbons such as propane and ethylene, and nitrous oxide are partially removed in PPUs. The removal of these impurities improves process safety of the ASU and eliminates the need for low temperature absorbers.

Feed air is purified by adsorption of impurities onto the surface of adsorbents such as activated alumina and molecular sieves that are contained in the PPU vessel. Oxygen, nitrogen and argon are not adsorbed and pass through the vessels. PPU vessels have a finite capacity for adsorption and must be regenerated so there are usually two or three beds on alternate duty. When one PPU bed reaches its saturation point, the air is switched to flow through the other bed. During regeneration, PPUs are depressurized and regeneration gas is passed through the off-stream vessel to remove the adsorbed components. As discussed later, FIG. 1 describes a typical two bed, dual-layer PPU arrangement.

The adsorption beds in the PPUs may contain more than two layers to remove other impurities in the feed air. For example, a palladium and a carulite layer are usually added in the adsorbent bed to remove hydrogen and carbon monoxide by converting them to water and carbon dioxide respectively before the feed stream enters the cryogenic distillation.

The present inventors have discovered that the use of ionic liquids in the pre-purification of air prior to cryogenic distillation offers a number of advantages over the use of traditional adsorbents such as activated alumina and molecular sieves. These advantages include the ability to remove impurities in feed air more effectively to achieve continuous operation thus allowing for simpler process designs; more effective catalyst-product separation; reduction of vessel volume and associated costs; reduction in energy consumed and its commensurate costs; and reduction in malfunctions encountered in adsorbent beds due to the damage of adsorbents caused by high velocity gas flows and rapid pressure changes.

SUMMARY OF THE INVENTION

The invention provides for a method for removing impurities from a feed gas stream comprising feeding the feed gas stream to an adsorption vessel which contains an ionic liquid.

The invention provides for the pre-purification of a feed gas stream prior to it undergoing cryogenic distillation such as in an air separation unit.

The impurities that are removed by the invention are selected from the group consisting of carbon dioxide, hydrogen sulfide, sulfur dioxide, hydrogen, carbon monoxide and hydrocarbons. The hydrocarbons are selected from the group consisting of butane, propylene, acetylene, propane and ethylene.

In another embodiment, the invention provides for a method for removing impurities from a feed gas stream containing impurities comprising the steps:

a) feeding the feed gas stream to a first adsorption vessel containing an ionic liquid, wherein the impurities are removed from the feed gas stream;

b) directing a portion of the feed gas stream free of impurities to a second bed, wherein the gas stream free of impurities regenerates the ionic liquid present in the second bed; and c) directing the remaining portion of the feed gas stream free of impurities to a cryogenic distillation unit.

The embodiment can be once through or can be cyclical such that while one vessel is adsorbing impurities from the feed gas stream, the second vessel is being regenerated.

Ionic liquids are purely ionic, salt-like materials that are liquid over a broad temperature range usually between −96° and 200° C. Ionic liquids are also non-volatile and are better able to be tailored by combinations of cations and anions.

In one aspect of the invention, the preferred ionic liquids are selected from the group consisting of imidazolium, pyridinium, pyrrooldinium, guanidinium, ammonium, phosphonium, and sulphonium-based ionic liquids, or mixtures thereof. These ionic liquids are task-specific ionic liquids (TSIL). These compounds have the following structures:

Cation

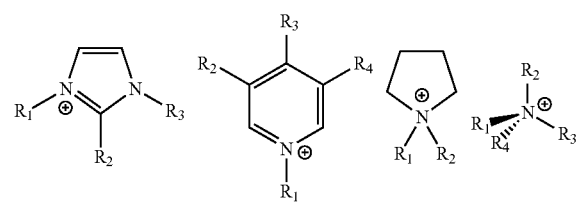

Anion

The various groups designated $R_1$, $R_2$, $R_3$, and $R_4$ are different alkyl and alkenyl groups. These groups may be selected from the group consisting of hydrogen, and straight or branched chain alkyl and alkenyl groups having from 1 to 12 carbons. Certain amine groups such as thiourea or amino groups can also be incorporated into the cation of the ionic liquid to improve its sequestration capability for and $CO_2$. Additionally, hydroxyl groups may be incorporated into the cation. For a specific application, consideration for the optimal combination of a cation and an anion is required to achieve high adsorption capacity and high thermal stability of the ionic liquids.

The ionic liquids can be coated onto the surface of substrates which can be incorporated into beds where the feed gas to be purified is directed.

The ionic liquids may also be employed by coating on or encapsulated in porous beads and/or pellets. The coated beads and/or pellets may be loaded into a vessel and will be in fixed, moving or fluidized beds.

The ionic liquids may also be coated onto or encapsulated in porous beads and/or pellets and these can be secured to or impregnated within layered or laminated sheet materials. The coated sheet materials that contain the coated beads and/or pellets are employed by stacking the sheets together to allow gaps between the sheets when stacked in the vessel. The flow of gas to be purified will be parallel to the sheet surface. When porous beads and/or pellets are employed that contain multiple channels throughout in an adsorber bed, resistance to gas flow would be similar in all directions. Gas flow in these instances may then be at an angle with respect to an individual bead and/or pellet but would be influenced by the engineering design of the adsorber bed. In applications such as packed bed adsorption applications, gas flow will be either axial along the bed or radial in the case of radial bed adsorbers.

If the ionic liquid materials are coated on a monolith substrate, gas flow through the monolith substrate adsorber will be parallel to the channels in the monolith substrate in order to minimize the pressure drop. In certain instances, the monolith adsorbent materials will have parallel channels in one direction and gas flow will be only in the direction parallel to the channels present therein.

BRIEF DESCRIPTION OF THE DRAWINGS

The FIGURE is a schematic of a two adsorption bed system in a pre-purification process per the invention.

DETAILED DESCRIPTION OF THE INVENTION

The ionic liquids of the invention are selected from the group consisting of imidazolium, pyridinium, pyrrooidinium, guanidinium, ammonium, phosphonium, and sulphonium-based ionic liquids, or mixtures thereof. These ionic liquids are task-specific ionic liquids (TSIL). These compounds have the following structures:

Cation

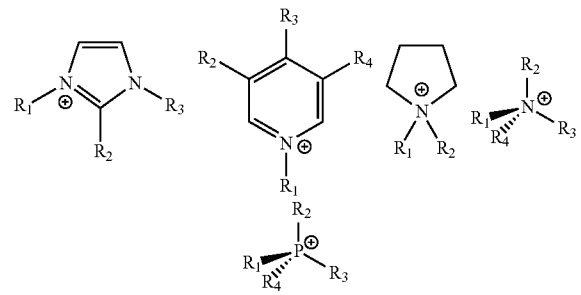

Anion

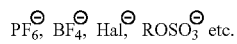

The various groups designated $R_1$, $R_2$, $R_3$, and $R_4$ are different alkyl and alkenyl groups. These groups may be selected from the group consisting of hydrogen, and straight or branched chain alkyl and alkenyl groups having from 1 to 12 carbons. Certain amine groups such as thiourea or amino groups can also be incorporated into the cation of the ionic liquid to improve its sequestration capability for and $CO_2$. Additionally, hydroxyl groups may be incorporated into the cation. For a specific application, consideration for the optimal combination of a cation and an anion is required to achieve high adsorption capacity and high thermal stability of the ionic liquids.

The ionic liquids can be coated onto the surface of substrates which can be incorporated into beds where the feed gas to be purified is directed.

The ionic liquids may also be employed by coating on or encapsulated in porous beads and/or pellets. The coated beads and/or pellets may be loaded into a vessel and will be in fixed, moving or fluidized beds.

The ionic liquids may also be coated onto or encapsulated in porous beads and/or pellets and these can be secured to or impregnated within layered or laminated sheet materials. The coated sheet materials that contain the coated beads and/or pellets are employed by stacking the sheets together to allow gaps between the sheets when stacked in the vessel. The flow of gas to be purified will be parallel to the sheet surface. When porous beads and/or pellets are employed that contain multiple channels throughout in an adsorber bed, resistance to gas flow would be similar in all directions. Gas flow in these instances may then be at an angle with respect to an individual bead and/or pellet but would be influenced by the engineering design of the adsorber bed. In applications such as packed bed adsorption applications, gas flow will be either axial along the bed or radial in the case of radial bed adsorbers.

If the ionic liquid materials are coated on a monolith substrate, gas flow through the monolith substrate adsorber will be parallel to the channels in the monolith substrate in order to minimize the pressure drop. In certain instances, the monolith adsorbent materials will have parallel channels in one direction and gas flow will be only in the direction parallel to the channels present therein.

The ionic liquids can be functionalized such that chemical groups can be added to the ionic liquid structure and imbue it with additional functional behavior. For example, to improve the ionic liquids sequestration capability for acidic gases such as carbon dioxide, hydrogen sulfide and sulfur dioxide in feed air gas stream, cations with alkaline groups such as free amine groups (thiourea or amino groups) can be incorporated into the ionic liquids. The absorption rate of the acidic gases can thus be tuned by the choice of cationic addition to the ionic liquids.

The removal of hydrogen, carbon dioxide and various hydrocarbons from the feed air gas stream can also be achieved by the ionic liquids by endowing them with catalytically active groups, or as solvents for other catalyst materials. The properties of ionic liquids, including non-volatile, high thermal stability, broad ranges of temperatures over which they are liquid, tenability of their acidities and their retention of polar or charged catalyst make them useful over a range of catalytic applications. The catalysts that can be incorporated in or dissolved in include noble metals selected from the group consisting of platinum, palladium and rhodium.

When water is present in the feed air gas stream, a drying unit may be used before the feed air contacts the ionic liquids. The drying unit can be an adsorption bed filled with activated alumina.

The ionic liquids of the invention can be employed in a single bed system or in a system with two or more beds. When multiple beds are employed, the system can be cyclical such that when one bed is adsorbing impurities from the feed air gas stream, the other bed is being regenerated.

The ionic liquids can be a single ionic liquid or mixtures of ionic liquids and can incorporate other functional compounds by acting as a solvent material for those compounds.

The ionic liquids can be employed in adsorption beds in a variety of systems. The ionic liquids can be employed in pressure swing adsorption (PSA), temperature swing adsorption (TSA), vacuum swing adsorption (VSA), vacuum pressure swing adsorption (VPSA) and concentration swing adsorption (CSA) processes.

A typical PSA cycle consists of the following sequence of steps: pressurization, adsorption with product withdrawal, blowdown, desorption at lower pressure, pressure equalization, and rinse.

The present invention is described with reference to the FIGURE which represents a two bed system for removing impurities from a feed air gas stream. The feed air gas stream which can be natural gas from a wellhead or that which is obtained from a coal-bed enters through line 1 to line 2.

Valves 2A and 2B are controlled so that the feed gas stream containing the acid gas impurity is directed along line 2 to line 3, Valve 2B remains closed while the feed gas stream travels through line 3 to first bed A. The first bed A will contain any of the variant means for removing the acid gases from the feed gas stream such as the ionic liquid coated on a monolith substrate, the ionic liquid coated on or encapsulated in beads and/or pellets, or the ionic liquid impregnated into the layered or laminated sheet materials. The impurities will remain in first bed A while the feed gas stream will continue through line 4 and open valve 5A through line 10 where the purified feed air gas stream is recovered before being fed to a cryogenic distillation unit.

A portion of the feed air gas stream that has been purified will flow through line 5 and open valve 5B to line 6 to enter second bed B. In this explanation of the operation of the two bed system, bed A is the production bed and bed B is the desorption or countercurrent bed. The order of which bed is the production bed will alternate so that while one bed is producing purified feed gas, the other bed is being purged of the impurities that were adsorbed or absorbed when it was acting as the production bed. The purified feed air gas stream entering second (bed B) will help desorb the acid gases that were adsorbed or absorbed when bed B was acting as the production bed. The purified gas stream which now contains the previously adsorbed or absorbed impurities will travel through line 7 where it will enter line 8 and open valve 8B and ultimately be vented through line 9, or it can be directed through line 8 and open valve 8A to line 3 where it will enter the first bed A for purification purposes.

Alternatively the gas stream containing the purged impurities can travel through line 7 to line 2 and open valve 2B where it will further travel through line 2 to open valve 2A and join the feed air gas stream entering through line 1 for purification.

While this invention has been described with respect to particular embodiments thereof, it is apparent that numerous other forms and modifications of the invention will be obvious to those skilled in the art. The appending claims in this invention generally should be construed to cover all such obvious forms and modifications which are within the true spirit and scope of the present invention.

Having thus described the invention, what we claim is:

1. A method for removing impurities from a feed gas stream containing impurities comprising the steps: a) feeding the feed gas stream to a first adsorption vessel containing an ionic liquid selected from the group consisting of imidazolium, pyridinium, pyrrooidinium, guanidinium, ammonium, phosphonium, and sulphonium-based ionic liquids, or mixtures thereof having the structures:

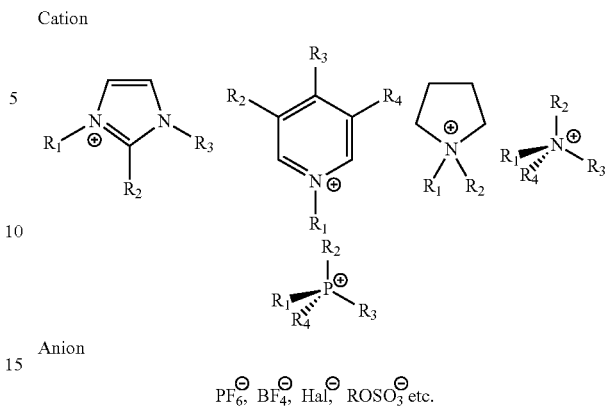

wherein $R_1$, $R_2$, $R_3$, and $R_4$ are different alkyl and alkenyl groups and are selected from the group consisting of hydrogen, and straight or branched chain alkyl and alkenyl groups having from 1 to 12 carbons further comprising an amine selected from the group consisting of thiourea and amino groups being present in said ionic liquid and a hydroxyl group being incorporated into said cation wherein the impurities are removed from the feed gas stream; b) directing a portion of the feed gas stream free of impurities to a second bed, wherein the gas stream free of impurities regenerates the ionic liquid present in the second bed; and c) directing the remaining portion of the feed gas stream free of impurities to a cryogenic distillation unit.

2. The method as claimed in claim 1 wherein said impurities are selected from the group consisting of carbon dioxide, hydrogen sulfide, sulfur dioxide, hydrogen, carbon monoxide and hydrocarbons selected from the group consisting of butane, propylene, acetylene, propane and ethylene.

3. The method as claimed in claim 1 wherein said ionic liquid is coated on substrate surfaces.

4. The method as claimed in claim 1 wherein said ionic liquid is coated on or encapsulated in porous beads and pellets.

5. The method as claimed in claim 1 wherein said method is selected from the group consisting of pressure swing adsorption, temperature swing adsorption, vacuum swing adsorption, vacuum pressure swing adsorption and concentration swing adsorption methods.

6. The method as claimed in claim 5 wherein said method is cyclical.

* * * * *